3,259,510
PROCESS FOR DISSOLVING HIGHLY CYANO-ETHYLATED CELLULOSE

Joseph R. Anghinetti, Somerville, N.J., assignor to American Cyanamid Company, New York, N.Y., a corporation of Maine
No Drawing. Filed Mar. 5, 1962, Ser. No. 177,189
3 Claims. (Cl. 106—191)

This invention relates to an improved process for producing highly-cyanoethylated cellulose. More particularly, it is concerned with an improvement in the manufacture of such cyanoethylated cellulose by reacting cellulose with acrylonitrile. Still more specifically, the invention contemplates the introduction of an inert diluent into the reaction medium, obtaining products containing 11.5–13 weight percent nitrogen.

An electroluminescent device, which is one illustration of devices in which use is contemplated of products produced by the process of the present invention, is basically a simple structure. In essence, such a device is comprised of two electrodes, at least one of which transmits light, between which a phosphor is embedded in a suitable matrix. Among the variety of previously-proposed dielectric matrices for electroluminescent phosphors are certain ethers of cellulose, as shown for example in U.S. Patents 2,774,004, 2,792,447, 2,918,594 and 2,901,652. The latter, in particular, suggests the use of certain types of cyanoethylated cellulose.

Such usage, however, inherently imposes certain physical limitations on the material which forms the matrix. One critical requirement is that it have an adequately high dielectric constant, S. Roberts, J. Opt. Soc. Am. 42, 850 (1952). The dielectric constant should be as high as possible in a product which (a) has a sufficiently low dissipation factor; (b) is adequately soluble in suitable solvents; and (c) is adapted to be cast from solution into stable, thin films. In addition, a good dielectric material for the present purposes should be satisfactorily free of self-color. It must be substantially water-white. A satisfactory dielectric material must have a low dissipation factor to avoid waste of electrical energy as unwanted heat. In general, a good dielectric for the present purposes should have a dissipation factor below 0.028.

When it is attempted to meet these several requirements with cyanoethylated cellulose, even further critical limitations are imposed. Cellulose, both natural and regenerated, has been reacted with acrylonitrile in various ways to produce cyanoethylated derivatives. Physical properties of the resultant products vary with the nature of the cellulose, its molecular weight, the method of treatment and the like. However, they are affected most noticeably by the extent to which the cellulose has been cyanoethylated.

Cyanoethylation of cellulose usually is defined in one of two ways, either by the nitrogen content, expressed in weight percent of nitrogen; or by a decimal fraction representing the number of cyanoethyl groups introduced per anhydroglucose unit. This decimal fraction usually is referred to as the "degree of substitution." For purposes of simplification, in this discussion the latter will be abbreviated as DS. Both terminologies are used in this specification. Complete cyanoethylation corresponds to a nitrogen content of about 13.1 percent and a DS of three.

At low degrees of substitution, i.e., a DS up to about two, cyanoethylation does not greatly alter the solubility or the physical appearance of the cellulose, the fibrous characteristics being largely retained. Most of the early work in cyanoethylation was in this field. However, as the DS increases progressively above about two, loss of fibrous characteristics and resemblance of the product to a thermoplastic resin becomes increasingly noticeable. Moreover, solubility of the product in certain organic solvents develops. These latter characteristics begin to become dominant in products having a DS above about 2.3; approximately corresponding to nitrogen content percentages ranging from about 11.3 up to slightly over 13.

In later work it was found that such products, particularly those having a DS above 2.5, have electrical characteristics that are useful for a number of purposes. Among such characteristics are a relatively high dielectric constant and a relatively low dissipation factor. It is with such highly-cyanoethylated cellulose products that the present invention is particularly concerned. Again for purposes of simplification, in this discussion such products will be referred to using the abbreviation "HCC."

For the present purposes, as noted above, an HCC product must have a dielectric constant requirement in the desired range of from about eleven to fourteen. To attain this value in HCC ordinarily requires producing a DS of at least about 2.3, preferably 2.35 or higher, corresponding to a nitrogen content of at least about 11.3 percent, preferably some 11.5 or higher. This constitutes one of the definite requirements.

It has been long known that HCC having a nitrogen content of 11.4% or more can be produced. This is shown, for example, in U.S. Patent No. 2,375,847. According to this patent, cellulose is reacted with a relatively large amount of acrylonitrile (at least 5 parts by weight per part of cellulose) in the presence of a relatively small amount of water and an alkaline water-soluble catalyst.

In theory, 3 mols of acrylonitrile (M.W. 53) are required per glucose unit (M.W. 162) of cellulose for complete cyanoethylation. This represents about one part by weight of acrylonitrile, hereinafter abbreviated as "AN," per part of cellulose. Unfortunately, such compositions cannot be handled in usual mixing equipment. Less than patentees, 5 parts by weight of AN per unit is useless. Less than 10 parts requires high-power mixing equipment. Patentees say at least 15 parts per part is preferred. In actual practice it is found that less than 20 parts per part is impractical in ordinary equipment.

In any case, the process requires use and recovery of an uneconomically large excess of AN. Moreover, it is not possible by such known methods to produce HCC having a dielectric constant above about nine to ten. Thus, while HCC products have been previously available which meet the dielectric requirements for some electrical usages, they did not, however, meet the eleven to fourteen limitation required for many other purposes.

Unfortunately, too, industrial utilization of HCC in this increasingly important field has been hampered by the fact that in such previously-available HCC the dissipation factor is entirely too high. Moreover, the color of such products has been much too dark. Finally, it has been impossible to take such products up in a useful solvent to cast a suitable film having the desired lack of color.

Previous attempts to overcome these difficulties have not been adopted on an industrial scale. A number of reasons are involved. Some required excessively delicate control. Some required unusual equipment or solvents. Some just would not produce the product. Nevertheless, if a process which is not subject to these problems could be developed, it would be highly useful. Particularly is this true with respect to overcoming the economic disadvantages in the necessary use of the large excess of AN.

It is, therefore, a major object of the present invention to develop a process for producing an HCC product which is not subject to these limitations.

In accordance with this invention, it has now been discovered that a large portion of the excess acrylonitrile used in the prior art processes can be replaced by a relatively small amount of an inert diluent. This can be done without adversely affecting the yield or quality of the cyanoethylated cellulose. In accordance with this invention, cellulose is reacted in the presence of an inert diluent, a small amount of water and an alkali metal hydroxide, as in the above-noted Patent 2,375,847. However, much less acrylonitrile is used than that required in the preferred processes of the prior art.

Use of diluents for the AN have been previously proposed, as is also shown for example in the above-noted patent. However, as noted therein, when such practice was tried, a DS as high as two was not obtainable. This makes the result successfully obtained in the present invention even more surprising, the present procedure being directly contra to the teachings of previous experience in the art.

As thus expressed in general terms, the improvement of the present invention is deceptively simple. Most of the diluents discussed in the above-noted patent cannot be used in the process of this invention. Among the previously-proposed diluents which have been tried and found to be unusable herein are benzene, toluene, dioxane and halogenated hydrocarbons. Typical of other common solvents found non-useful are dibutyl ether, pyridine, carbon tetrachloride, dichloroethylene, diethyl carbitol, and ethyl acetate.

Diluents which may be used in this invention include saturated aliphatic straight-chain hydrocarbons of six or more carbons such as: n-hexane, n-heptane, n-octane, n-decane and the like. Petroleum distillates such as solvent naphthas and the like also may be used. No one solvent is perfect. Use of lower boiling diluents, such as lower boiling petroleum fractions, requires extended reaction periods. Higher boiling diluents require higher distillation temperatures for removal of the diluent. Of the few solvents found useful, n-heptane appears to have the optimum combination of desirable properties and is the preferred diluent. Accordingly, since they have limited mutual solubility, it appears probable that the diluent should be only partially miscible with acrylonitrile. However, their use does enable conventional equipment, such as an agitator-equipped kettle, rather than high-power requirement equipment of the dough-mixer type, and the like.

It is an advantage of this invention that substantially any cellulose material can be treated thereby. Thus, cellulose and some chemically related compounds are polymers of anhydroglucose. Different polymers are customarily classed in terms of the number of anhydroglucose units in a molecule. Chemically, an anhydroglucose unit is a trihydric alcohol. One hydroxyl group is a primary alcoholic hydroxyl, the other two being secondary. Celluloses are predominately 1-4 polymers, the number of polymerized units being customariily referred to as the degree of polymerization, abbreviated herein as "DP."

In common with other polymers, each cellulose polymer is a mixture of polymers of various molecular weights. It is the average DP which determines the classification of a specific product. In general, celluloses suitable for use in the present invention have an average DP ranging from above about 200 up to over 1000. Various available cellulosic materials fall within this limit, e.g., viscose rayons with an average DP ranging from about 250 to about 350; natural cotton with an average DP of from about 850 to 1000; and certain wood pulp derivatives having a DP in excess of 1000.

Although the invention is not so limited, viscose rayon flock is perhaps to be preferred. It yields a final product, which, because of its low viscosity and excellent handling characteristics, is in most cases well suited for effecting the purposes of this invention. Accordingly, viscose rayon and similar regenerated celluloses, although of relatively low degree of polymerization, constitute a preferred embodiment.

For any one cellulose chosen as a starting material, there is an optimum cellulose:acrylonitrile weight ratio for the reaction. In this connection, the DP of the cellulosic starting material requires consideration. It influences the amount of excess acrylonitrile required. The latter serves not only as an essential reactant, but the excess above the stoichiometric requirements serves also as a solvent for HCC having a DS above about 2.3. In general, celluloses of high DP form more viscous solutions and so require the use of a larger excess of acrylonitrile. There is, therefore, a procedural advantage in using cellulosic starting materials of lower molecular weights, within the range of limits set forth above.

Viscose rayon flock, being of low viscosity and readily available at moderate cost, is a preferred raw material. Cotton linters and certain wood-pulp celluloses are, of course, equivalent chemically and somewhat cheaper than viscose flock. However, the necessary use of additional acrylonitrile and other problems resulting from higher viscosity of the final product may frequently more than offset the initial saving.

It will be found that the reaction mix temperature during cyanoethylation may vary within the range of from about 50° to about 72° C. It is advantageous, however, to keep the average temperature at as nearly within a range of 65°–70° C. as is practicable. While AN boils at about 77° C. and n-heptane, for example, at about 98° C., the presence of the water produces a boiling point for the mixture lower than that of either the AN or the diluent. In most cases it will be found that the mixture will have a reflux temperature in the preferred range, i.e., about 65° to about 70° C.

Cyanoethylation, even in the reaction of the present invention, requires the presence of some excess of acrylonitrile. Ordinarily, this may range from about four to about eight times the weight of the cellulose. However, the preferred proportion in good practice will be about 5.5 to 6.5. Use of a correct excess operates to maintain reasonable reaction rates and to form with the diluent and water a reaction medium in which the cyanoethylated cellulose, when formed, is soluble. When too little acrylonitrile is used, the reaction increasingly is viscous and the product is not homogenous. The upper limit is a compromise. Enough should be used to be able with the diluent to obtain the desired viscosity. Use of more than the recommended amount is undesirable. It not only reduces the productive capacity of a given kettle, but also causes a tendency for the HCC product to separate from the medium as a paste.

As to the amount of diluent to be used in optimum reaction media, the proportions appear to vary somewhat with the organic diluent being used. The practice using the preferred n-heptane is typical and will be used as illustrative. Proportions using other diluents will not differ very greatly. All parts, ratios and percentages discussed below are by weight unless otherwise noted.

As to the amount of the combined AN and diluent to be used, the minimum is about five parts per part of cellulose. Use of at least seven is preferable. Provided there is present sufficient AN to complete the reaction and with the other liquids (a) to produce an adequate low viscosity and (b) keep the product in solution, the minimums are satisfied. There is no real upper limit on the total liquid usage. Kettle capacity and economy, however, indicate the futility of using an unduly great excess.

In using the minimum practical amount of AN plus diluent, it will be found that the maximum AN:diluent ratio should be about 6.0 to 6.5:1. If this ratio is increased while using the minimum AN:cellulose ratio, the viscosity increases. It is possible to obtain good products with ratios up to about 20:1 but the viscosity becomes too high to be practical above about 10:1 and higher than desirable above the noted 6.5:1.

As the ratio of the (AN plus diluent):cellulose is increased above the minimum of about 5:1, the AN:diluent ratio may be decreased. For the latter, from about 1.5:1 to about 4:1 is good practice when using an AN:cellulose ratio of from about 5:1 to 7:1. However, it should not go below about 1:1. At lower ratios there is excessive polymerization of AN.

The particular caustic alkali used is not critical. However, as there is no particular advantage in using the more expensive potassium hydroxide, sodium hydroxide generally is preferred. Optimum alkali usage will vary somewhat with the particular cellulosic starting material chosen and with the reaction temperature used. A good general practice is to use an amount of alkali ranging from about 0.5% to 3.0% on the weight of cellulose. The concentration of aqueous alkali in the solution added is not critical. Instead, the critical factor is the weight ratio of alkali to water in the whole reaction mixture. This ratio is discussed below in greater detail.

Another factor which prior to the present invention required being very carefully considered is the possiblity of dangerous thermal runaway. If the ratio of caustic material to water becomes too high, unreacted acrylonitrile can and will polymerize with evolution of a great amount of heat. This not only results in acrylonitrile loss, but may introduce a serious explosion hazard.

Simple addition of a large amount of water does not solve this problem. Caustic alkali is not distributed uniformly through the reaction mass throughout the whole reaction period. At one stage, for instance, caustic is suddenly liberated into the surrounding reaction medium containing a large excess of acrylonitrile. This starts a competing reaction between acrylonitrile and water to form oxydipropionitrile. This reaction may be quite localized in some cases. Each molecule of oxydipropionitrile formed removes a molecule of water from the reaction medium. As a result, the alkali concentration continues to rise. If sufficient water is not available, the alkali concentration can pass the critical limit and again introduce an explosion hazard.

It is a notable advantage of the present invention that it reduces these hazards to such an extent that the possibility of thermal runaway is no longer of critical importance.

In the prior practice the caustic concentration limit was not only critical but it also was dependent upon the reaction temperature. In general, the higher the temperature, the lower the concentration of caustic which can cause thermal runaway. However, the lower temperatures in the range noted above were not desirable because they resulted in slower reaction. Practically, therefore, it was more desirable to carry out the reaction at the higher temperatures noted above. At these temperatures, the caustic:water ratio, i.e., the critical concentration of caustic may be as low as eleven to fifteen percent. This requires a relatively large initial amount of water to create a safety factor.

However, an excessive initial large amount of water introduces a further problem. It results in a greater total formation of oxypropionitrile because it has been found that the product is formed by a reaction which proceeds at a rate only slightly below that proportional to the cube of the water concentration. Serious material losses can result and the overall cost of the process rises concomitantly.

It is another marked advantage of the present invention that the caustic:water ratio is no longer critical. Thus, in accordance with the present invention, it will be found good practice to maintain the total water content throughout the reaction at such a level that the weight ratio of caustic to water is from about 1:15 to about 1:40.

The reaction at the reflux temperature is continued until the reaction is essentially complete. Under the preferred conditions, about 1–2 hours are required. However, too long a reaction time may cause polymerization of the excess acrylonitrile.

The cyanoethylated cellulose may be isolated by any convenient means. An advantageous method is to neutralize the alkalinity of the reaction mixture with acetic acid and then to distill off the diluent and excess acrylonitrile while maintaining a constant volume by adding water. The product is filtered off and washed with water. If a cyanoethylated cellulose product with a very low dissipation factor, i.e., low salt content, is desired, demineralized water is used throughout the reaction and isolation steps. This method of isolation is not a part of the present invention, being shown in the copending application for U.S. Letters Patent of K. W. Saunders, Serial No. 131,529, filed August 15, 1961, and assigned to a common assignee.

The invention will be further described in conjunction with the following illustrative examples. Therein, unless otherwise specified, all parts and percentages are by weight and temperatures are in degrees centigrade.

*Example 1*

To illustrate the use of a relatively low AN:cellulose ratio in a preferred embodiment of the invention, a mixture of 900 parts of AN, 154 parts of n-heptane and 150 parts of rayon flock is heated to the reflux temperature and 58 parts of 4.5% aqueous sodium hydroxide is added. After 1.5 hours of refluxing, 21 parts of glacial acetic acid is added and the stirring continued for about 45 minute. Fifty parts of water is added and the n-heptane and unreacted AN are distilled from the reaction mixture while simultaneously adding water equal in volume to the distillate. The cyanoethylated cellulose is filtered off from the hot reaction mixture, washed by slurrying twice in 5 parts of water per part of dry product, filtered and dried at 70° C. The product contains 12.5% nitrogen.

It will be seen that the AN:cellulose ratio is about 6:1 and the AN:diluent ratio is about the same (6:1), the AN plus diluent ratio being about 7:1.

*Example 2*

Example 1 is repeated except that the reflux period is increased to two hours. The product contains 12.7% nitrogen.

*Example 3*

To illustrate the use of lower AN:cellulose ratios by decreasing the AN:diluent ratio, a mixture of 800 parts of AN, 274 parts of n-heptane, 200 parts of rayon flock and 90 parts of 6.0% aqueous sodium hydroxide is made and refluxed (67° C.) for about 25 minutes. After adding 35 parts of glacial acetic acid and 400 parts of water, distillation of the heptane and excess AN and the isolation of the product is carried out as described in Example 1. The product contains 10.8% nitrogen.

*Example 4*

Example 3 is repeated except that the reflux period is extended to about 60 minutes. The product has a nitrogen content of 12.5%.

From these examples, it will be seen that HCC products comparable to those of Examples 1 and 2 in nitrogen content are obtained. However, the AN:cellulose ratio is only 4:1 and the AN plus diluent:cellulose ratio is only 5.4:1. This was accomplished by decreasing the AN:diluent ratio to about 3:1.

*Example 5*

To illustrate the effect of too high an AN:diluent ratio at low AN:cellulose ratios, the procedure of Example 1 is repeated using a mixture of 350 parts of AN, 25 parts of n-heptane, 50 parts of rayon flock, 11 parts of 6% aqueous sodium hydroxide and 20 parts of water and refluxing for about 45 minutes. The reaction mixture is far more viscous than in Example 1. Although reaction conditions were poor the product nitrogen content is about 10%.

It will be seen from this example that at an AN:diluent ratio of about 14:1, the process is not wholly satisfactory even using a higher AN:cellulose ratio (7:1) and a higher AN+diluent:cellulose ratio (7.5:1) than in Example 1.

*Example 6*

Example 2 is repeated using a reaction mixture of 288 parts of AN, 205 parts of n-heptane, 72 parts of cellulose and 64 parts of 6% aqueous sodium hydroxide and a reflux period of 40 minutes. The AN:diluent ratio is 1.4:1 and the AN+diluent:cellulose ratio is 6.8:1. Viscosity is good and the product has a satisfactory nitrogen content of about 12.2%.

*Example 7*

Three reactions are run according to the procedure of Example 1 under identical reaction conditions except for the amounts of AN and n-heptane used. These amounts are shown in Table I. The indicated amounts are combined with 200 parts of rayon flock and 90 parts of 6% aqueous sodium hydroxide and the mixture is refluxed for 45 minutes and neutralized with 35 parts of glacial acetic acid.

TABLE I

| Run No. | Parts by Weight | | Ratios | | Product, percent N |
|---|---|---|---|---|---|
| | AN | Heptane | AN:Heptane | AN:Cellulose | |
| a | 800 | 274 | 2.9:1 | 4:1 | 12.1 |
| b | 560 | 480 | 1.2:1 | 2.8:1 | 11.9 |
| c | 480 | 550 | 0.87:1 | 2.4:1 | 11.7 |

It is to be noted that the AN+diluent:cellulose ratio in each case is about the same (5.37:1, 5.20:1 and 5.15:1) but in Run "c" where the AN:diluent ratio is below 1:1, the product contained polymerized acrylonitrile. It should be noted also that Examples 2 and 3 and Run "a" of Example 7 are run under the same conditions except for the length of the reflux period. The effect of the latter on this reaction mixture is shown in the following tabulation:

Time                                   Product
(minutes):                        (percent N)
25 _____ 10.8
45 _____ 12.1
60 _____ 12.5

*Example 8*

The procedure of Example 1 is repeated using a reaction mixture of 144 parts of AN, 99 parts of n-hexane, 36 parts of rayon flock and 32 parts of 6% aqueous sodium hydroxide and a reflux period of about two hours. Viscosity is good and the product has a satisfactory nitrogen content.

*Example 9*

To further illustrate the effect of the diluent, Example 1 is repeated replacing the one part of diluent with two parts of AN. A mixture of 160 parts of AN, 20 parts of rayon flock, 2.1 parts of aqueous 6% sodium hydroxide and 4 parts of water is used. Reaction started only after an additional 8 parts of water was added. A very stiff reaction mixture containing a viscous paste is formed and reaction is unsatisfactory even at the 8:1 AN:cellulose ratio.

*Example 10*

The procedure of Example 8 is repeated substituting for the n-hexane an equivalent volume of various other diluents as shown in the following listing:

| Run No. | Diluent | Amount (parts by wt.) |
|---|---|---|
| 1 | Benzene | 132 |
| 2 | Toluene | 130 |
| 3 | Dibutyl ether | 116 |
| 4 | Pyridine | 148 |
| 5 | Carbon tetrachloride | 240 |
| 6 | Dichloroethylene | 190 |
| 7 | Dioxane | 155 |
| 8 | Ethyl acetate | 135 |
| 9 | Diethyl Carbitol | 136 |

In no case was the reaction satisfactory.

From the preceding examples it will be seen that the overall result is quite unexpected. A properly proportioned AN-diluent mixture is far superior in use to the use of AN alone. An AN-cellulose ratio as high as 8:1 still will not give a satisfactory reaction mixture or the desired high nitrogen content. However, as little as 5:1 of a mixture containing as little as about one part diluent in 6.0–6.5 parts of AN will unexpectedly produce excellent results. Still more surprisingly, if the mixture contains only a slight excess of AN over that required to form the desired DS and enough diluent is used to provide a mixture:cellulose ratio above about 6.5:1, the desired DS is readily obtainable. Moreover, the product is readily recoverable, there is very little AN loss, and the product has the desired properties.

I claim:

1. A process for producing a solution of highly cyanoethylated cellulose containing more than 2.3 cyanoethyl groups per anhydroglucose unit which comprises agitating at about its reflux temperature a reaction mixture consisting essentially of, by weight,
   (a) 1.0 part of cellulose;
   (b) at least 2.75 parts of acrylonitrile;
   (c) from about one-sixth part to about one part per part of said acrylonitrile of a diluent selected from the group consisting of saturated aliphatic hydrocarbons having about six to about twelve carbon atoms and the low boiling solvent naphtha petroleum distillate fractions, for a total of at least about 5.0 parts of combined acrylonitrile and diluent;
   (d) from about 0.25 to about 1.0 part of water; and
   (e) about one part of caustic material for each fifteen to forty parts of water
until the resulting cellulose reaction product is substantially dissolved.

2. A process as defined in claim 1 wherein said diluent is n-heptane.

3. A process as defined in claim 1 wherein said diluent is n-hexane.

References Cited by the Examiner
UNITED STATES PATENTS 2,015,104   9/1935  Dreyfuss _____ 260—231
2,390,032  11/1945  Stallings _____ 260—231
2,724,632  11/1955  Weisberg _____ 260—232
2,812,999  11/1957  Weisberg _____ 260—231

WILLIAM H. SHORT, *Primary Examiner.*

ABRAHAM H. WINKELSTEIN, *Examiner.*

R. S. AULL, E. C. EDWARDS, L. P. QUAST,
                                      *Assistant Examiners.*